S. J. WENTWORTH.
HEEL MACHINE.
APPLICATION FILED MAY 29, 1915.

1,361,942.

Patented Dec. 14, 1920.
6 SHEETS—SHEET 6.

INVENTOR
Samuel J. Wentworth

UNITED STATES PATENT OFFICE.

SAMUEL J. WENTWORTH, OF NEWPORT, KENTUCKY, ASSIGNOR, BY MESNE ASSIGNMENTS, TO UNITED SHOE MACHINERY CORPORATION, OF PATERSON, NEW JERSEY, A CORPORATION OF NEW JERSEY.

HEEL-MACHINE.

1,361,942.     Specification of Letters Patent.     Patented Dec. 14, 1920.

Application filed May 29, 1915. Serial No. 31,259.

*To all whom it may concern:*

Be it known that I, SAMUEL J. WENTWORTH, a citizen of the United States, residing at Newport, in the county of Campbell and State of Kentucky, have invented certain Improvements in Heel-Machines, of which the following description, in connection with the accompanying drawings, is a specification, like reference characters on the drawing indicating like parts in the several figures.

This invention relates to heel machines and more particularly to a machine for use in building heels or for operating upon heels in the process of heel building.

The object of the invention is to produce a machine with the aid of which heels of a superior quality may be turned out at a rapid rate and which is adapted to handle a wide range of work without the necessity of frequent tedious adjustments.

In the process of heel building as customarily practised, a plurality of individual lifts, usually of graduated sizes, are pasted and assembled in the form of a heel blank, which is put under pressure for an instant while a nail is driven through the lifts to aid in securing them together. After a considerable quantity of these heel blanks has accumulated, they are piled upon a board, another board is placed upon them and the whole is subjected to pressure in a screw press. Inasmuch as several piles of heels are placed upon the board and there is more or less variation in the heights of the individual heels, it frequently happens that many of the heels receive little, if any, pressure from the screw. Furthermore, a sufficient interval elapses between the building of the first heels and the placing of the accumulation of heels in the press to allow the paste in many of the heels to become more or less set, or crystallized, and lose its adhesive quality, so that the lifts do not adhere together, no matter how much pressure they may receive. There is a resulting tendency in a considerable portion of the heels to "check," which is very detrimental to the appearance of the shoe to which the heel is attached.

By the present invention, a station is provided at which the pasted heel lifts are assembled. The blank is then transferred immediately, while the paste is yet wet, to mechanism which exerts a plurality of successive pressures upon it with intervening periods of release. The successive pressing operations are continued for a substantial length of time, alternately admitting air to the paste, and spreading the paste and expressing any excess thereof from between the lifts. Under this treatment the paste rapidly becomes "tacky" and when it is finished the lifts are in intimate contact over their entire areas and adhere very tightly together. The heels thus produced are so much superior to heels produced by the old methods that it is not even necessary in all instances to use nails in addition to the paste, to secure the lifts together. Provision has, however, been made in the present machine for driving one or more nails through the lifts, if desired, and one part of the invention relates to an improved organization of nailing mechanism in combination with heel transferring and discharging means.

In order that the machine may have a large capacity, provision is made for exerting pressure upon a plurality of heel blanks simultaneously, in a plurality of successive positions in the machine. In the embodiment of the invention illustrated in the accompanying drawings, a form of construction is shown embodying a head, carrying a number of pressers, and a turret, carrying a number of heel clamps arranged to carry heels held therein under the pressers in succession. The pressers are preferably reciprocated continuously, while the movement of the turret is intermittent, so that each heel receives a plurality of pressures in each of the successive pressing positions. One feature of the invention relates to the formation of a "cup" or concavity in the heel seat by pressing the heel between suitably formed members in one or more of the pressing positions above mentioned.

Further features of the invention comprise improvements in mechanism for transferring, handling and discharging the heel blanks and in various other details of the machine which will become apparent from the following description and the accompanying drawings.

Referring to the drawings, 10 designates the base or frame of the machine. A portion of this frame consists of a stationary table 12 over which the heel blanks are moved into their successive pressing positions. A bracket 14 extends forwardly from the table 12 and supports guides 16 upon which a heel building block 18 is mounted to slide. The block 18 is provided with an upstanding gage 20, against which the breast edges of the lifts are placed as they are assembled. The breast gage 20 is carried by a base 22 mounted to slide in grooves 24 in the block 18 and a thumb screw 26 is provided for adjusting the breast gage longitudinally of the heel building block in order to determine the location of the heel relative to the holes in the nailing die 28, which is inserted in the block 18. This adjustment also provides for locating heels of different sizes properly in the clamps upon a turret to be hereinafter described. Attached to the upper end of the breast gage is a bracket 30 which has pivoted to it at 32 a clamping and nail clenching plate 34. A spring 36 secured to the bracket 30 bears upon lugs 38 projecting from the plate 34 in such a manner as to tend to keep the plate in either vertical or longitudinal position as it may be placed. The breast gage base 22 has a downward projection 40 into which is threaded a hand operated screw 42 arranged to adjust the height of the breast gage 20 as is clearly shown in Fig. 3.

Figure 1:
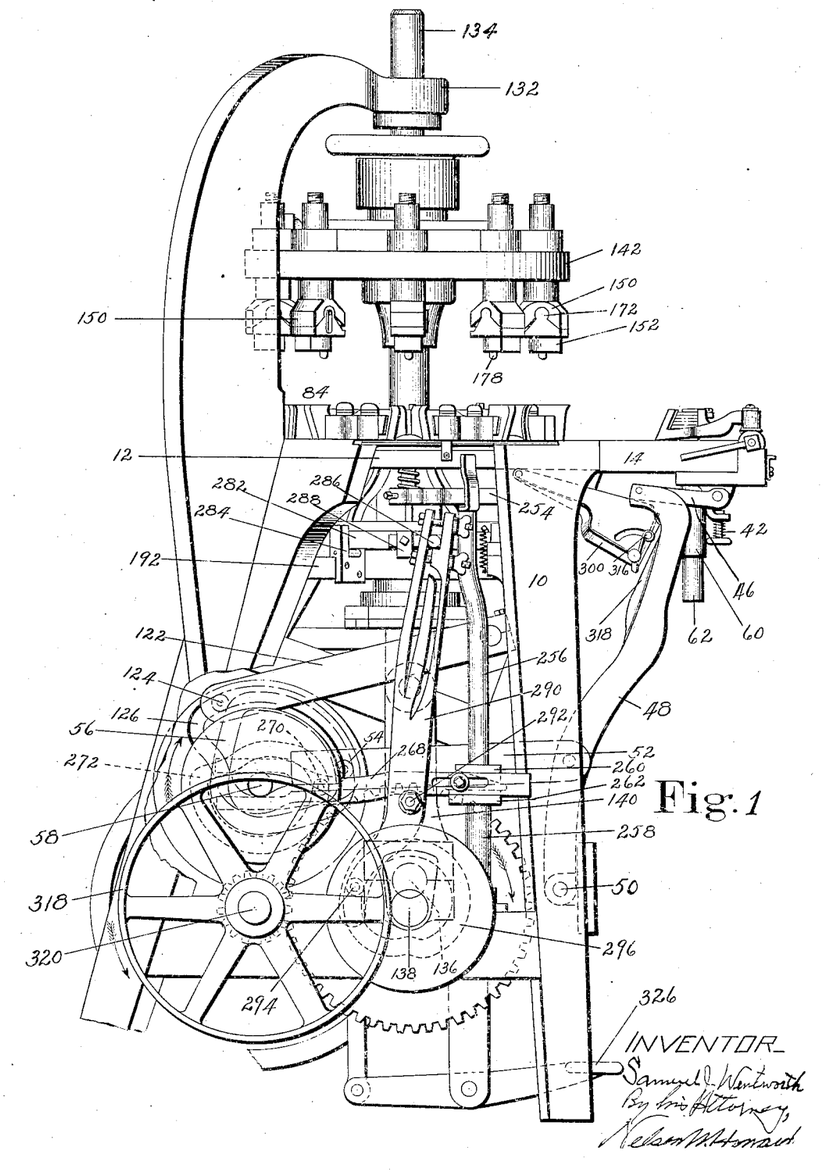
Figure 1 is a view in elevation showing the left side of the machine.
Figure 2:
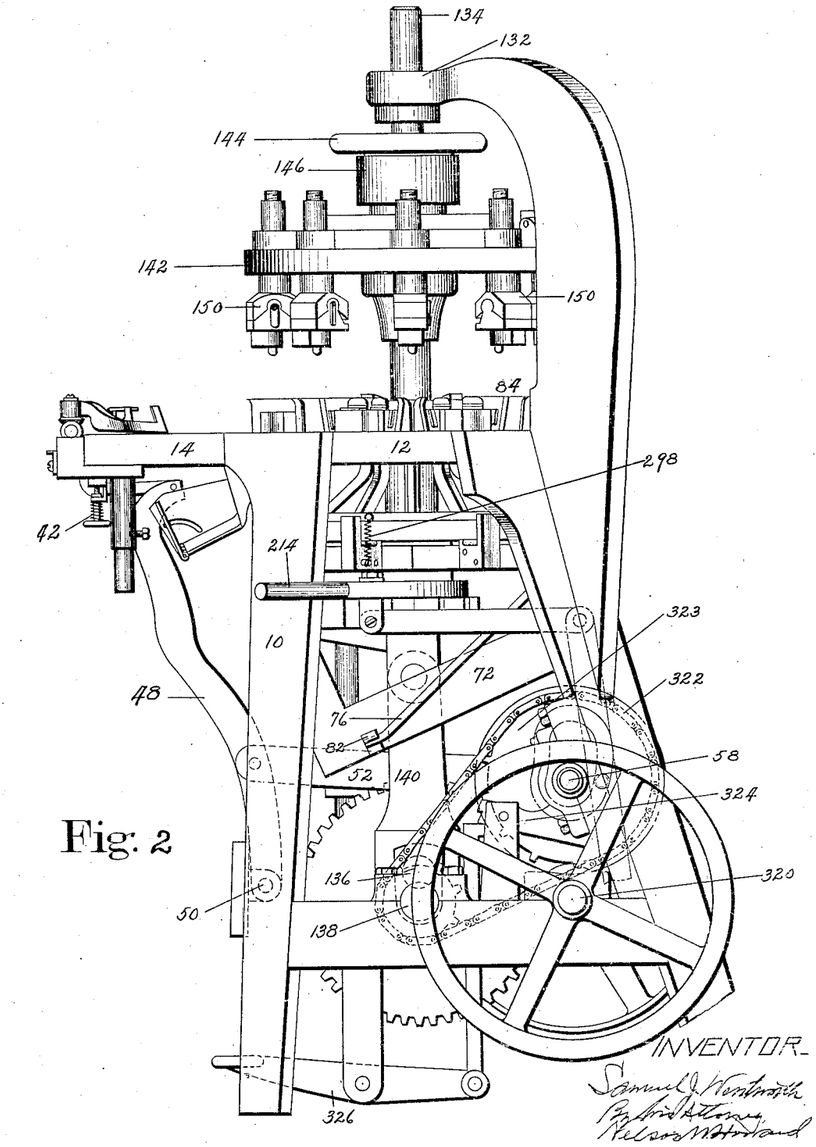
Fig. 2 is a view similar to Fig. 1 showing a right side elevation.
Figures 3, 4:
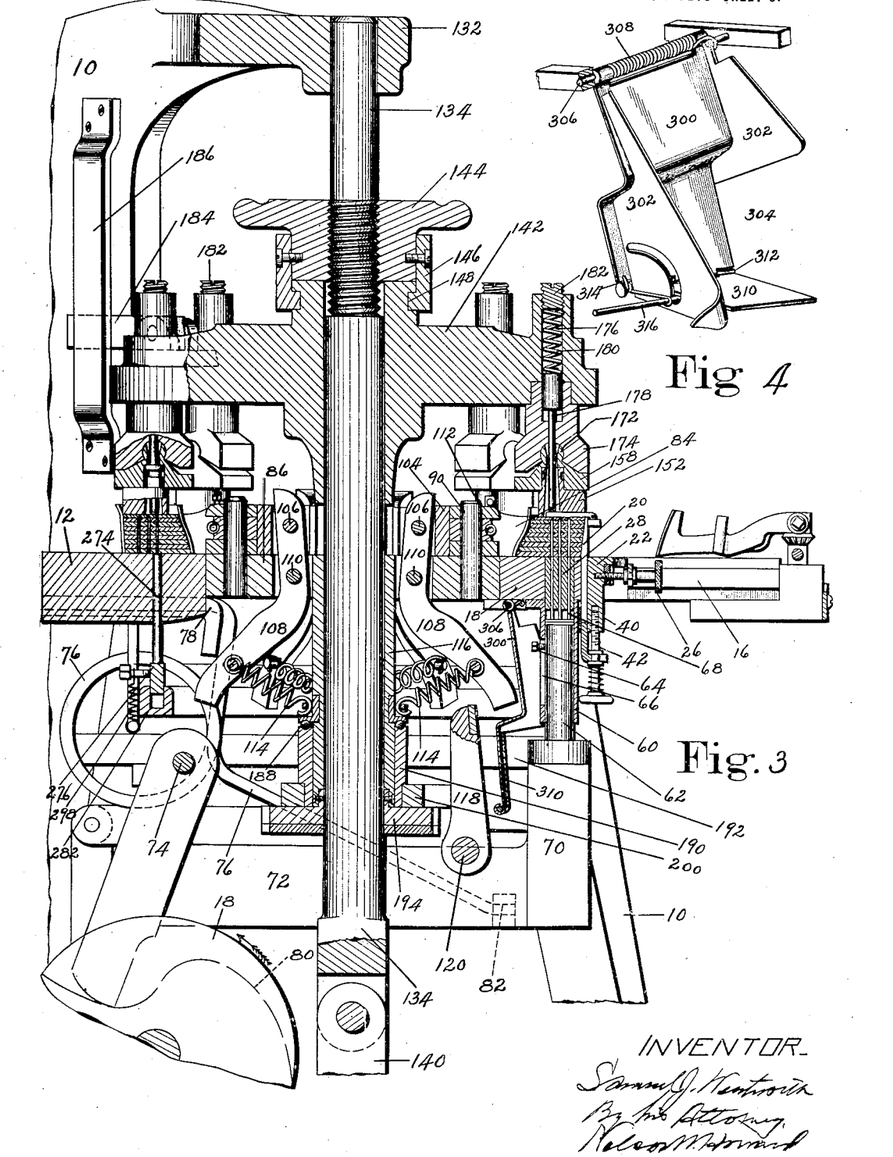
Fig. 3 is a central, vertical, longitudinal section from front to rear, looking from the left of the machine.
Fig. 4 is a detail of the discharging chute.

The heel building block and the mechanism carried by it form a carrier for transferring the assembled heel from the position shown in Fig. 1 to that shown in Fig. 3. A pivot 44 projecting laterally from the block 18 is connected by means of a link 46 to a lever 48, which is in turn pivoted to the frame 10 at 50. A link 52 is pivoted to the lever 48 and carries a cam roll 54, operated by a cam 56 mounted upon a cam shaft 58. Rotation of the cam 56 thus causes oscillation of the lever 48, and reciprocation of the block 18, between heel building and delivering positions.

Depending from the block 18 is a cylindrical housing and guide 60 for the driver plunger 62 which is prevented from falling out of the housing by a screw 64 traveling in a slot 66 in the wall of the housing. Nail drivers 68 are carried upon the upper end of the plunger. The portion of the nailing mechanism just described travels with the block 18 from the heel building position shown in Fig. 1 to the position shown in Fig. 3, where the driver plunger 62 comes into coöperative relation to a hammer 70 carried at the outer end of a lever 72 pivoted to the frame of the machine at 74. A heavy spring 76, anchored to the frame at 78, tends to move the hammer upwardly against the plunger 62. The action of the hammer is controlled by a cam 80 upon the cam shaft 58. The spring 76 is connected to the hammer lever by a hook 82 in such a manner that it may be disconnected by unhooking when it is desired to operate the machine without driving nails.

Referring to Figs. 3, 5 and 6, 84 indicates a clamp for receiving and removing an assembled heel from the building and transferring block 18. A number of these heel clamps are arranged in a circumferential series upon the table 12, the clamps being supported and actuated to move over the table 12 by a turret 86. As all the clamps in the series are identical in construction, it is necessary to describe but one. Each clamp consists of a pair of arms 88 having bearings at their rear ends mounted loosely upon a common pivot pin 90, which is secured in the turret 86. The arms 88 are held on the pin 90 by gravity only and may be freely lifted off the pin, if desired, for renewal or the substitution of another set of arms. Each arm carries at its outer end a heel engaging jaw 92, having a rounded portion 93 entering a corresponding bore in the arm and removably secured to the arm by a thumb screw 94 having one side of its head flattened. A limited amount of pivotal movement about the axis of the rounded portion 93 is permitted, whereby the angular position of the heel engaging jaws may be changed to accommodate heel blanks of various shapes. The extent to which the clamp closes may be adjustably regulated, by means of a screw 96 threaded in a lug 98 upon one arm and engaging a lug 100 upon the other arm. The rear portions of the clamping arms have flattened, divergent surfaces 102 against which bears a clamp arm closing member 104 connected by a pin 106 to the upper end of a lever 108 which is pivoted in the turret at 110. An expansion spring 112 inserted in holes bored in the arms 88 tends to separate the said arms. Coiled springs 114, anchored at their inner ends to a sleeve 116 depending from the turret 86, have their outer ends connected to the levers 108. The springs 114 tend to draw the lower ends of the levers 108 toward the center of the machine and to throw the upper ends of the said levers outward. The members 104 are thus pressed against the faces 102 and, since the springs 114 are sufficiently strong to overcome the springs 112, the clamps are normally closed. It will be observed that the clamp is both opened and closed yieldingly, reducing the danger of breakage in case undue resistance is encountered by any of the parts, and permitting the clamp to accommodate itself automatically to heels of different sizes.

Figures 6, 7, 8, 9:
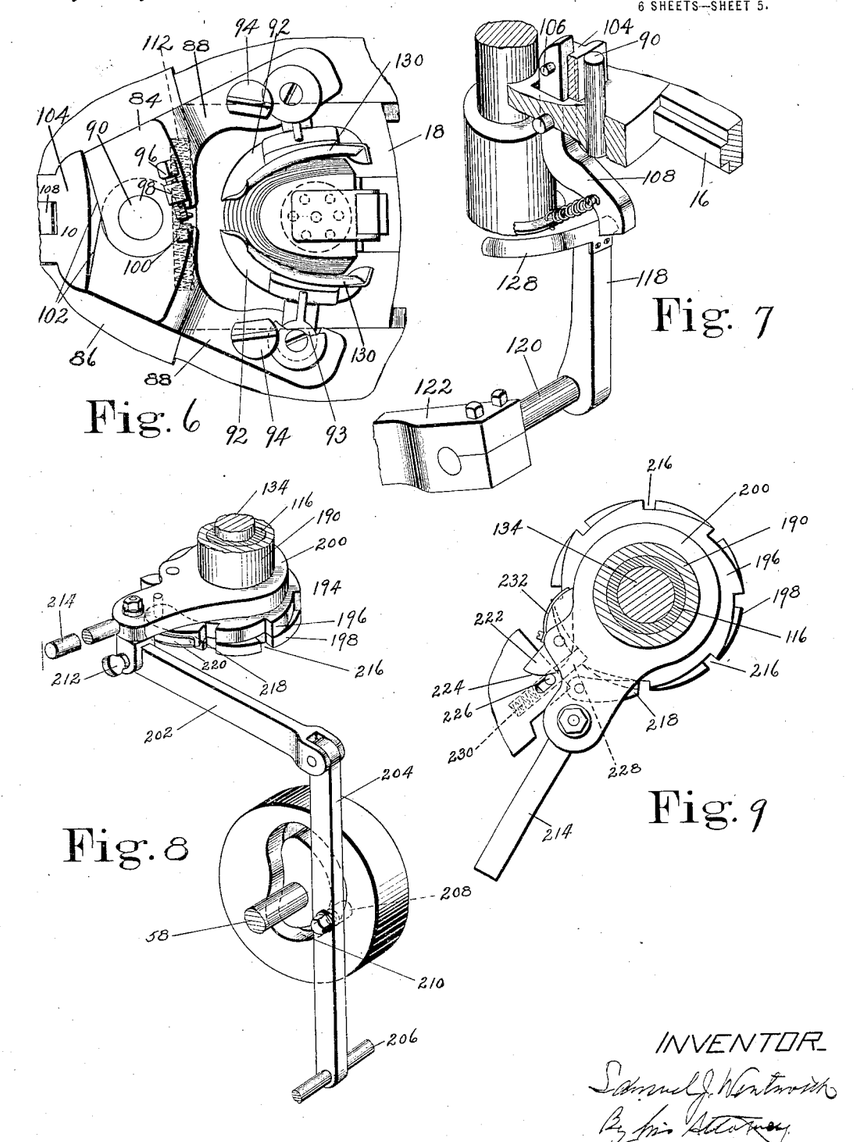
Fig. 6 is a plan view if a heel in nailing position in one of the clamps.
Fig. 7 is a detail of the mechanism for opening and closing the clamps.
Figs. 8 and 9 are details of the mechanism for rotating the turret.
Figure 12:
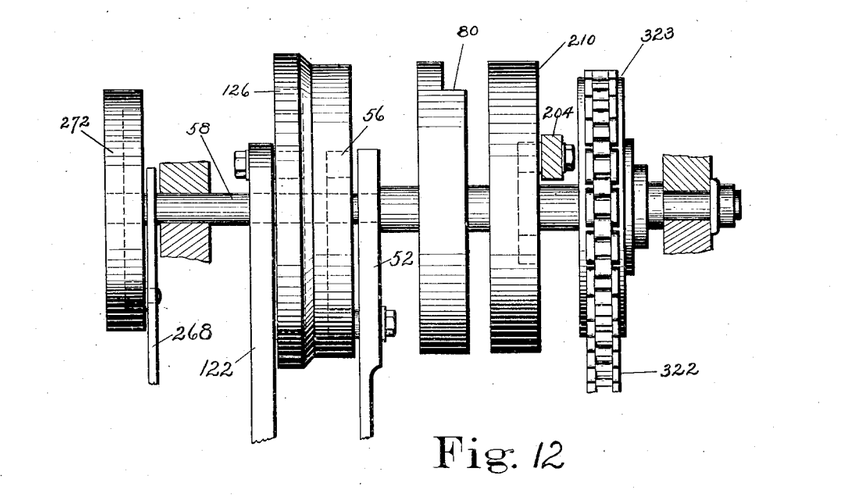
Fig. 12 is a plan view of the cam shaft which controls the various parts of the mechanism.
Figures 13, 14:
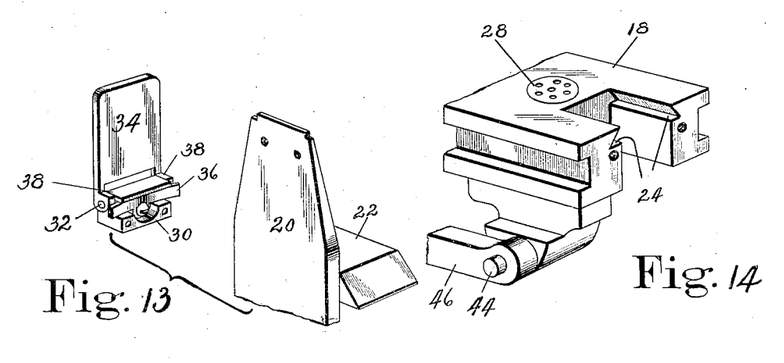
Figs. 13 and 14 illustrate details of the heel building block and breast gage.

In order to open the clamp 84 to permit the removal of a finished heel and the insertion of a new blank, the lower ends of the levers 108 are thrown outward, whereupon the clamp is opened by the spring 112. This operation of the levers 108 is effected by a rocker arm 118 projecting upwardly from a rock shaft 120 which has a cam lever 122 projecting rearwardly from it. The cam lever carries a cam roll 124 which is operated by a path cam 126 upon the cam shaft 58. Mounted upon the upper end of the lever 118 is a cam shaped lever operating member 128, upon which the lower ends of the levers 108 run as the turret 86 is rotated. At the proper times, the cam 126 operates the rock shaft 120 to open the clamp whose operating lever 108 is at that time in engagement with the operating cam 128.

The upper edges of the clamp jaws 92 are turned outwardly, as shown at 130, to permit the easy entrance therebetween of the heel pressing devices, which will now be described. The frame 10 is provided with an overhead support and guide 132 in which a rod 134 reciprocates vertically. The lower portion of the rod 134 passes through, and is guided by, the sleeve 116, and vertical reciprocation is imparted to the rod by a crank 136 upon the crank shaft 138, connected to the rod 134 by a connecting rod 140. The crank shaft 138 runs continuously and the upright rod 134, consequently, reciprocates continuously. A presser head 142 is mounted upon the rod 134 adjustably, in a vertical sense, by means of a hand wheel 144 having threaded engagement with the rod and having a collar 146 engaging in a groove 148 in the upper portion of the head. It will be apparent that the mounting of the head 142 upon the rod 134 is such that the head will partake of the vertical reciprocations of the rod.

A number of heel pressing devices 150, equal to the number of clamps 84, is carried by the presser head 142 but since these pressing devices are all identical in construction it will be necessary to describe but one of them in detail. A heel engaging presser 152 (see Fig. 11) is provided with a stem 154 adapted to enter a hole 156 in the block 158. The stem 154 has a circumferential groove 160, forming a collar 162 which is notched at 164 to permit it to pass the pin 166 which is pressed inwardly of the block 158 by a spring 168. After the stem of the presser 152 is inserted in the hole 156 the presser is turned until the end of the pin 166 bears upon a flattened or indented spot 170 on the stem, which thus detachably holds the presser 152 in the block 158. The upper portion of the block 158 is horizontally cylindrical, as shown at 172, and fits in a corresponding horizontal cylindrical bore in the presser holder 174 depending from the head 142. The construction of the holder 174 and the block 158 is such as to permit the block and the presser carried by it to have a limited amount of pivotal movement about the axis of the cylinder 172. This axis is transversely located with relation to the heel upon which the presser operates and the purpose of the pivotal movement is to permit the presser to seat itself firmly upon heels having surfaces of various inclinations relative to the horizontal.

The head 142 is bored out at 176 to permit the insertion of a pin 178 upon the upper end of which bears a spring 180 maintained in a compressed condition by a screw 182. The pin 178 passes through the holder 174 and the presser 152, its lower end bearing upon the heel and serving to separate from the presser 152 any heels which might adhere to it after the pressure was removed. The hole through the block 158 and the presser 152, through which the pin passes, is enlarged as shown in Fig. 3 so that the pin will not interfere with the pivotal movement of those members about the axis of the cylinder 172. The head 142 is held from rotation by a latch 184 pivoted to it and held by a keeper 186 upon the frame 10. The latch may be thrown up when desired and the head 142 rotated to permit easy access to the pressers.

The sleeve 116 carrying the turret 86 is mounted upon a ball bearing 188 supported upon a stationary collar 190 which, in turn, is carried by a series of stationary radial arms 192 forming a part of the frame of the machine. The rotation of the turret to bring the heels successively under the pressers 152 is effected by mechanism which will now be described. A ratchet wheel 194 is secured to the lower end of the sleeve 116 and consists of two parts 196 and 198 (see Figs. 8 and 9). A ratchet collar 200 loosely surrounds the stationary collar 190, resting upon the upper surface of the ratchet wheel 194. The collar 200 is connected by a link 202 to a cam lever 204 pivoted at 206 to the machine frame and carrying a cam roll 208 which engages in a path cam 210 upon the cam shaft 58. Rotation of the cam 210 imparts to the lever 204 an oscillatory movement which is transmitted to the collar 200 by the link 202. By this construction the oscillation of the collar 200 is normally effected automatically but the connection between the link 202 and the collar 200 comprises a pin 212 arranged to be withdrawn easily to disconnect the link from the collar. A handle 214 is provided for oscillating the collar 200 when the power transmitting mechanism is disconnected. The sections 196 and 198 of the ratchet wheel are rigidly connected together, the section 196 having ordinary ratchet teeth around its periphery while the section 198 has a peripheral series of notches 216. A pawl 218 is pivoted upon the under side of the collar 200 and pressed by a spring 220 into engagement with the teeth of the ratchet 196. A dog 222 upon the under side of the collar 200 has a cam surface 224 arranged to engage a projection 226 upon a locking pin 228 which is pressed by the spring 230 into one of the notches 216. A spring 232 tends to hold the dog 222 in the position shown in Fig. 9. When the collar 200 is rotated in a counter clockwise direction the cam face 224 of the dog 222 engages the pin 228 and retracts it from the notch 216 where it has held the ratchet 194, and the turret to which the latter is attached, locked against rotation. Continued movement of the collar 200 in the same direction causes the pawl 218 to engage a tooth of the ratchet 196 and rotate the same, turning the turret sufficiently to move the series of heel clamps 84 one step. In the movement of the collar 200 the dog 222 has passed the projection 226 and the locking pin 228 enters the next notch 216, holding the turret locked against rotation while the collar 200 is returned to its former position. During the return movement of the collar the spring 232 permits the dog 222 to pass the projection 226 without retracting the locking pin.

For the purpose of alining the heel lifts laterally as the heel is built up, a pair of arms mounted upon the bracket 14 is provided. Each of these arms comprises two resilient members 234 and 236 arranged to engage the sides and rear portion of heels of a great variety of sizes and shapes. The two arms are pivoted at 238 on the bracket 14 and are connected together for equal and opposite movement by beveled gears 240 and a rock shaft 242 which is oscillated manually by a handle 244 or a treadle connected thereto. By this arrangement the lifts may be repeatedly lined up as they are being assembled and the rapid building of a perfect heel is greatly facilitated.

Figures 5, 10, 11:
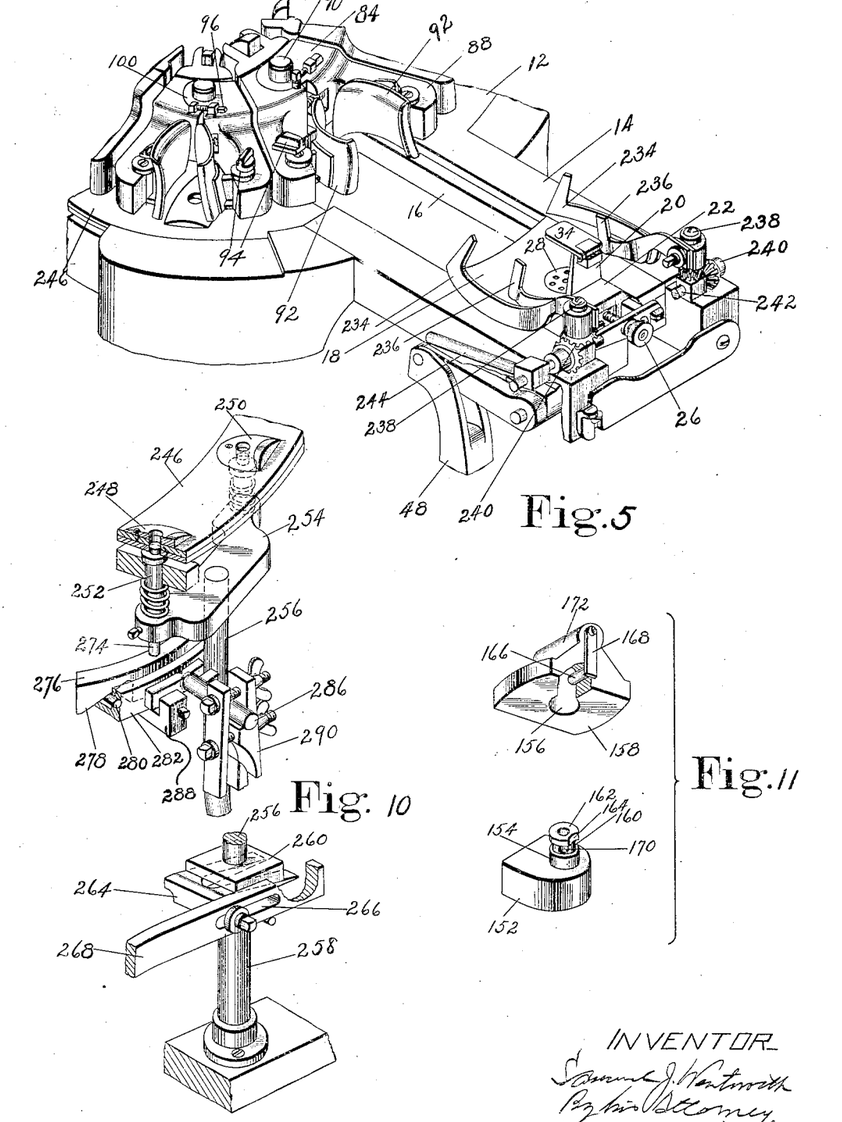
Fig. 5 is a detail perspective view showing the heel building block, transferring mechanism and receiving clamps.
Fig. 10 is a detail of the mechanism for forming the concavity in the heel seat.
Fig. 11 is a perspective view showing one of the heel pressers and its holder disassembled.

After the assembled heel is delivered to the first one of the clamps 84 the turret 86 is intermittently rotated to bring the heel successively under the various pressers 152. The heel is, as heretofore stated, submitted to the action of each presser a plurality of times. In the last two positions taken by the heel in its intermittent circular movement upon the table 12 a concavity or cup is formed in the heel seat. A plate 246 in a recess in the top of the table 12 has mounted upon it a pair of heel seat forming or cupping members 248, 250. These members are preferably detachably secured to the plates 246 as by screws, in order to permit their removal and the substitution of other plates for various sizes and styles of heels, and the convexity of the plate 250 may be greater than that of the plate 248 for the purpose of forming the concavity in the heel seat by successive actions rather than attempting to form it all at once. By this means it is possible to produce, with only a moderate pressure such as the illustrated machine is designed to afford, results such as have heretofore been secured only by heavy pressure. The plate 246 is supported upon bushings 252 secured in a cross head 254 which is mounted upon the upper end of an operating rod 256. The lower end of the rod 256 enters a hollow cylindrical guide 258 secured to the frame of the machine. A block 260 having an inclined lower face is secured upon the rod 256 and a stationary block 262 having a horizontal upper face is secured to the guide 258. A wedge 264 forked to embrace the rod 256, enters the space between the blocks 260 and 262, supporting the block 260 and being supported in turn by the block 262. The wedge is adjustably connected by a screw and slot connection 266 to a bar 268 forked at its rear end and loosely embracing the cam shaft 58. A cam roll 270 upon the bar 268 engages a path cam 272 upon the cam shaft. As the cam 272 is rotated the bar 268 is reciprocated forwardly and rearwardly of the machine and, by means of the wedge 264, the operating rod 256 and the plate 246 and cupping devices 248, 250 carried thereby are raised and lowered.

At each heel pressing position a pin 274 passes through a hole in the table 12 and serves the purpose of separating from the table any heels which may tend to adhere thereto. The lower ends of the pins 274 rest upon a ring 276 having a series of inclined faces 278 upon its under side. These inclined faces rest upon roller bearings 280 journaled in an annular member 282 mounted to oscillate in a horizontal plane upon roller bearings 284 supported upon the radial arms 192. A pin 286 is adjustably secured to the member 282 by a clamp 288. The upper end of a lever 290 pivoted at 292 to the machine frame operatively engages the pin 286. The lower end of the lever 290 is provided with a cam roll 294 operated by a cam 296 upon the crank shaft 138. Rotation of the cam 296 oscillates the lever 290 and the member 282, causing the ring 276 and the pins 274 resting thereon to rise and fall as the rollers 280 move beneath the inclined surfaces 278. Springs 298 (see Fig. 3) insure that the ring 276 shall rest firmly upon the rolls 280.

When the heel has made the circuit of the machine and has reached its initial position its holding clamp 84 is opened by the lever 118, as heretofore described, and the finished heel is dropped into the space beneath the clamp. In order to discharge the heel to a suitable receptacle a delivery chute is provided. This is most clearly illustrated in Fig. 4. A member 300 having side walls 302 and an opening 304 is hinged to the frame of the machine at 306. A spring 308 surrounding the pintle of the hinge tends to hold the chute 300 in delivery position, as shown in Fig. 1. The lower end of the chute 310 is hinged to the bottom at 312 and a spring 314 tends to keep the end raised as in Fig. 4. A pin 316 projecting laterally from the end portion 310 is arranged to be engaged by a cam face 318 formed upon the lever 48. When the chute is in the position shown in Fig. 1 the finished heel is dropped into it, sliding down by gravity and being discharged at the opening 304. As the lever 48 is moved rearwardly to move the heel building and transferring block 18 into the machine, the cam face 318 engages the pin 316, folding the end 310 down upon the bottom of the chute and then swinging the entire chute downwardly about the pintle 306 into the position shown in Fig. 3. By this means the depending nailing and adjusting mechanism carried by the heel block are permitted to move into the space formerly occupied by the delivery chute. As the lever 48 is again moved outwardly the chute automatically rises to its former position.

The machine is driven by power transmitted from any suitable source to the pulley 318 upon the main drive shaft 320. The main drive shaft is geared, as shown in Fig. 1, to the crank shaft 138 which, in turn, is connected by a sprocket chain 322 to a sprocket wheel 323 upon the cam shaft 58. A one revolution clutch 324, operated by a treadle 326, serves to connect the sprocket wheel 323 to, and disconnect it from, the cam shaft 58. The operation of the cam shaft 58 is thus under the control of the operative, while the main drive shaft 320 and the crank shaft 138 operate continuously.

The improvement in methods of making heels herein disclosed is claimed in an application filed concurrently herewith, Serial No. 31,260.

Having described my invention, what I claim as new and desire to secure by Letters Patent is:

1. In a heel machine the combination of a movable base member upon which a complete heel blank may be built in one position and from which it may be delivered transversely in another position, and pressing mechanism located at the delivery position of said member and constructed and arranged to receive the heel and subject it to pressure in a plurality of successive positions.

2. In a heel machine, the combination of a member upon which a heel may be built, a plurality of pressing devices arranged in successive positions, means for transferring the heel from building position to one of the pressing devices, and means for causing the heel to be subjected to the action of the pressing devices in said successive positions.

3. A heel machine having, in combination, means for facilitating the assembling of a series of lifts into the form of a heel, means for transferring the assembled heel from assembling position to a pressing position and means for automatically exerting upon the heel a plurality of successive pressures.

4. A heel machine having, in combination, means for facilitating the assembling of a series of lifts into the form of a heel, a plurality of pressing devices arranged in different positions, means for transferring a heel from assembling position to a pressing device, and means for transferring the heel from one pressing position to another, whereby it may be subjected to a plurality of successive pressures.

5. In a heel machine, the combination of a series of heel clamping units each adapted to clamp a heel, means permanently located at an assembling position for alining a series of lifts superposed in the form of a heel, means for transferring assembled heels successively from assembling position to said heel clamping units respectively, and means arranged to move said heel clamping units successively into register with said transferring means.

6. In a heel machine, the combination of means for supporting and moving an assembled heel and means for exerting upon the heel a plurality of successive pressures in each of a plurality of different positions.

7. In a heel machine, the combination of means for supporting a plurality of assembled heels and a plurality of pressing devices constructed and arranged to exert upon each individual heel a plurality of distinct pressures in each of a plurality of positions.

8. In a heel pressing machine, the combination of means for supporting a pile of assembled heel lifts of different sizes, and means for exerting a plurality of successive, distinct pressures upon the pile of lifts in each of a plurality of positions and in a direction substantially normal to their planes.

9. In a heel machine a movable block upon which a heel may be assembled, movable lift alining members adjacent to the heel assembling position of said block, heel pressing mechanism, and means for moving the block with the assembled heel thereon away from the lift alining members into position to deliver the heel to the pressing mechanism.

10. In a heel machine, the combination of means for supporting an assembled heel, means for exerting pressure upon the heel in a direction normal to the planes of the lifts, and means, including a plurality of dies of different convexity constructed and arranged to engage the heel successively, for thereafter forming, by pressure, a concavity in the heel seat.

11. In a heel machine, the combination of means for supporting an assembled heel, means for automatically exerting upon the heel a plurality of successive pressures, and means, including a plurality of dies of different convexity constructed and arranged to engage the heel successively, for forming a concavity in the heel seat.

12. In a heel machine, the combination of a heel press comprising a series of pressing devices, means for causing said devices to apply pressure to heels at a series of successive stations, and means constructed and arranged to facilitate the assembling of a series of lifts into the form of a heel, said assembling means being movable from a heel assembling position outside of the press to a position to deliver an assembled heel to the press at one of said stations.

13. In a heel machine, the combination of a frame, a rotatable turret, a series of expansible heel clamps upon the turret, and a plurality of reciprocatory pressers coöperatively related to the clamps for exerting pressure upon the seat faces of heels held therein.

14. In a heel machine, the combination of a frame, a rotatable turret, a series of expansible heel clamps upon the turret, a reciprocatory head, a series of heel pressers mounted upon the head in coöperative relation to the heel clamps, and means for reciprocating the head.

15. In a heel machine, the combination of a frame, a reciprocatory head, a series of heel pressers mounted upon the head, a rotatable turret, a series of heel clamps upon the turret, means for continuously reciprocating the head, and means for intermittently rotating the turret.

16. In a heel machine, the combination of a multiple press comprising a plurality of press couples constructed and arranged to exert independent pressure upon a plurality of heels simultaneously, and means for facilitating the assembling of a series of lifts into the form of a heel, said means being located adjacent to the press in a position to facilitate the transfer of a heel from said means to the press.

17. In a heel machine, the combination of a multiple press constructed and arranged to press a plurality of heels simultaneously, means for facilitating the assembling of a series of lifts into the form of a heel, and means for transferring an assembled heel from assembling position to a position in the multiple press.

18. In a heel machine, the combination of a table arranged to support a series of heels, a series of pressers arranged in coöperative relation to the table to exert pressure upon the heels, means for advancing the heels so that each heel shall be subjected to the action of the successive pressers, a portion of the table being provided with a convex heel seat forming element and means for lowering said portion at times, to permit the series of heels to be moved successively upon said convex element.

19. In a heel building machine, the combination of a movable block upon which a heel may be built, a gage upon the block for alining the heel lifts, and a clamping plate upon the gage arranged to engage the heel and prevent it from becoming misplaced in transit.

20. In a heel building machine, the combination of a movable block upon which a heel may be built, nailing mechanism, part of which is arranged to move with the block to and from coöperative relation to the remainder, and a nail clenching plate movable with the block to and from nail driving position.

21. In a heel machine the combination of nail driving mechanism, a heel support in coöperative relation thereto arranged to be retracted to permit the discharge of a heel, a delivery chute located to receive the heel and in the path of movement of part of the nail driving mechanism, and means for retracting the chute to permit operation of the nail driving mechanism.

22. In a heel machine, the combination of a carrier for transferring a heel from building to pressing position, a heel delivery chute normally located in the path of movement of the carrier, and mechanism for moving the carrier, one element of said mechanism being provided with a cam coöperatively related to the chute to cause the latter to be retracted from the path of movement of the carrier.

23. In a machine of the class described, the combination of heel transferring mechanism, a delivery chute, and means for both retracting and folding the delivery chute upon movement of the transferring mechanism.

24. In a heel machine, the combination of mechanism for transferring a heel from one position to another, and a delivery chute in the path of movement of the transferring mechanism constructed and arranged to be retracted as the transferring mechanism is advanced.

25. In a heel machine, the combination of a table constructed and arranged to support a series of heels, means for moving the series of heels step by step, power mechanism for actuating the heel moving means, means for connecting the power mechanism to, or disconnecting it from the heel moving means, and manual means for operating the heel moving means independently of the power mechanism.

26. In a heel pressing machine, the combination of a heel support, mechanism for moving a heel across the support, means for pressing a heel upon the support and pushing means operating in timed relation to the heel moving mechanism for separating an adhering heel from the support prior to the operation of said mechanism.

27. In a heel machine, the combination of means for facilitating the assembling of a heel, a turret, a plurality of heel clamps upon the turret, and means for taking an assembled heel from an assembling position remote from the turret and inserting it in one of the clamps upon the turret.

28. In a heel machine, the combination of means for facilitating the assembling of a heel, a rotary turret, a plurality of expansible heel clamps upon the turret, means for holding the clamps open, successively, as they pass one point in the rotation of the turret, means for closing the clamps as they leave the said point, and reciprocating transferring means for taking an assembled heel from an assembling position remote from the turret and inserting it in the clamp which is open.

29. In a heel machine, the combination of means for facilitating the assembling of a heel, a rotary turret, a plurality of spring closed clamps upon the turret, means for opening the clamps successively at one point in the rotation of the turret, and automatic means for transferring a heel from an assembling position remote from the turret to the clamp which is open.

30. In a heel pressing machine, the combination of a heel support, mechanism for moving a heel across the support, a pusher arranged to separate an adhering heel from the heel support, and means for projecting the pusher to effect the separation prior to the operation of said mechanism.

31. In a heel machine, the combination of means for facilitating the assembling of a heel, a rotary turret, a plurality of spring closed clamps upon the turret, means for opening the clamps successively at one point in the rotation of the turret, automatic means for transferring a heel from an assembling position remote from the turret to the clamp which is open, and means for discharging a pressed heel from a clamp just prior to the arrival of the clamp at said point.

32. In a heel machine, a heel clamp comprising an upright pivot pin, and a pair of removable clamping arms having bearings loosely surrounding the pin and maintained in position thereon by gravity, the pin being constructed to permit the arms to be lifted freely from it.

33. In a heel machine, a heel clamp, comprising a pair of clamping arms pivoted upon a common center, the rear ends of said arms having divergent bearing faces, and a clamping arm operating member bearing upon said divergent faces for operating the clamp.

34. In a heel machine, a heel clamp comprising a pair of oppositely movable clamping members, yieldably means for causing relative approaching movement of said members, a projection upon one of said members, and an adjustable device upon the other of said members arranged to engage the projection to limit the approaching movement of the members.

35. In a heel machine, the combination of means for supporting separately a plurality of assembled heels, and means for automatically exerting upon the heels in each of a plurality of positions a plurality of successive pressures in a direction normal to the planes of their lifts.

36. In a heel machine, the combination of a series of heel clamping units each adapted to clamp a heel, means permanently located at an assembling position for alining a series of lifts superposed in the form of a heel, means for transferring assembled heels successively from assembling position to said heel clamping units respectively, means arranged to move said heel clamping units successively into register with said transferring means, and means for opening each heel clamping unit as it approaches heel receiving position.

37. In a heel machine the combination of a series of heel clamping units each adapted to clamp a heel, means permanently located at an assembling position for alining a series of lifts superposed in the form of a heel, means for transferring assembled heels successively from assembling position to said heel clamping units respectively, means arranged to move said heel clamping units successively into register with said transferring means, and means for closing each heel clamping unit after a heel is received by it.

Is testimony whereof I have signed my name to this specification.

SAMUEL J. WENTWORTH.